United States Patent [19]
Lee

[11] Patent Number: 5,646,789
[45] Date of Patent: Jul. 8, 1997

[54] OBJECTIVE LENS DRIVING APPARATUS

[75] Inventor: Kwang-Suk Lee, Seoul, Rep. of Korea

[73] Assignee: Daewoo Electronics Co., Ltd., Seoul, Rep. of Korea

[21] Appl. No.: 550,353

[22] Filed: Oct. 30, 1995

[30] Foreign Application Priority Data

Oct. 31, 1994 [KR] Rep. of Korea ............... 94-28298

[51] Int. Cl.⁶ ............................................. G02B 7/02
[52] U.S. Cl. .................. 359/814; 359/824; 369/44.15; 369/247
[58] Field of Search ........................ 359/813, 814, 359/823, 824; 369/44.15, 44.16, 247, 248

[56] References Cited

U.S. PATENT DOCUMENTS

| | | | |
|---|---|---|---|
| 5,046,820 | 9/1991 | Saekusa et al. | 359/814 |
| 5,072,433 | 12/1991 | Tanaka | 369/44.16 |
| 5,264,968 | 11/1993 | Masunaga | 359/824 |
| 5,323,369 | 6/1994 | Kim | 369/44.15 |

*Primary Examiner*—Loha Ben
*Attorney, Agent, or Firm*—Fish & Richardson P.C.

[57] ABSTRACT

An objective lens driving apparatus has a base provided with a plurality of focusing and permanent magnets and a supporting post being mounted on an upper surface thereof, a supporting shaft mounted on the upper surface of the base, a lens holder for holding an objective lens at an extension thereof, with the lens holder being rotatably and slidably fitted onto the supporting shaft at a position of the center of gravity of the lens holder and being provided with focusing coils and tracking coils (the lens holder is provided with one or more through holes being disposed at a side wall thereof). One or more elastic members are stretched between the supporting post of the base and the lens holder in a plane including Y axis line joining the supporting shaft and the objective lens and Z axis line being axis line of the supporting shaft. One or more damping members keep vibration of the lens holder from being transmitted to the elastic members, the damping members being inserted between the through holes and the elastic members, respectively.

12 Claims, 5 Drawing Sheets

5,646,789

OBJECTIVE LENS DRIVING APPARATUS

BACKGROUND OF THE INVENTION

1. Field of the Invention

The present invention relates to an objective lens driving apparatus for an optical pickup unit suitable for use in a system such as a CD player, an LD player, a CD-ROM driver or the like which reproduces recorded information from a recording medium such as CD, LD, CD-ROM or the like.

2. Description of the Prior Arts

Generally, in a system such as a CD player, an LD player, a CD-ROM driver or the like, an optical pickup unit is used for reading information from a recording medium. The optical pickup unit is moved in a radial direction of the recording medium which rotates with uniform speed to follow a recording track on which the information is recorded. A laser beam for reading information is focused on the recording track formed on the surface of the recording medium by means of the optical pickup unit. The recorded information is recovered from the recording medium in terms of a change in the reflection of the irradiated reading laser beam.

Since it is necessary that the reading laser beam is correctly focused on the recording surface of the recording medium irrespective of fluctuation of the position of the recording surface, for instance caused by a curvature of the recording medium, the optical pickup unit is designed to include a support structure of an objective lens which allows the movement of the objective lens in a direction perpendicular to the recording surface. Further, since it is also necessary that the reading laser beam always correctly follows the recording track irrespective of eccentricity of the recording track which may sometimes be present, the optical pickup unit is designed to include the support structure which allows lateral movement of the objective lens in a direction perpendicular to the direction of the recording track.

FIG. 1 shows construction of a prior objective lens driving apparatus disclosed in U.S. Pat. No. 5,046,820.

In FIG. 1, the prior objective lens driving apparatus is provided with a lens holder 2, a base 10 and a supporting shaft 11.

An objective lens 1 is fixedly inserted into an extension of the lens holder 2. A bearing bore 3 is formed at the center of gravity of the lens holder 2 including focusing coils 5a and 5b and tracking coils 6a, 6b, 6c and 6d. The lens holder 2 is rotatably and slidably fitted onto the supporting shaft 11. A line which joins the center of the objective lens 1 and the center of the bearing bore 3 is referred to as the "Y axis", the axis of the bearing bore 3 is referred to as the "Z axis", and a line intersecting the Y and Z axes is referred to as the "X axis". Focusing coils 5a and 5b are arranged symmetrically with respect to the X and Y axes in opposite recesses which are formed in the lens holder 2 along the Y axis. Four tracking coils 6a, 6b, 6c and 6d are arranged symmetrically with respect to the Y and X axes outwardly of the focusing coils 5a and 5b.

The base 10 is provided with inner yokes 9a and 9b and outer yokes 8a and 8b, which are mounted symmetrically with respect to the Y axis, as well as four posts 16a, 16b, 16c and 16d, which are mounted symmetrically with respect to the Y and X axes. Permanent magnets 7a and 7b are fixed to the respective outer yokes 8a and 8b in such a manner that the polarity of each of the permanent magnets 7a and 7b is oriented in the same direction. The focusing coil 6a and the tracking coils 6a and 6c are inserted between the inner yoke 9a and the permanent magnet 7a, while the focusing coil 5b and the tracking coils 6b and 6d are inserted between the inner yoke 9b and the permanent magnet 7b. Slit pieces 18a, 18b, 18c and 18d are disposed on the top of the posts 16a, 16b, 16c and 16d, respectively.

Elastic members 4a, 4b, 4c and 4d extend through slits formed in the corresponding slit pieces 18a, 18b, 18c and 18d, and are fixed by solder joints 15a, 15b, 15c and 15d. The other ends of the elastic members 4a, 4b, 4c and 4d are engaged with respective pins 13a, 13b, 13c and 13d and are fixed by an epoxi- or silicon-type adhesive (not shown). The elastic members 4a, 4b, 4c and 4d are radially arranged to join the lens holder 2 and the base 10, thereby elastically retaining the lens holder 2 in a plane substantially perpendicular to the supporting shaft 11.

In the prior-art objective lens driving apparatus as constructed above, when the focusing coils 5a and 5b are energized, the lens holder 2 slides along the supporting shaft 11 by an electromagnetic action produced between the focusing coils 5a and 5b and permanent magnets 7a and 7b provided on the base 10, thereby enabling adjustment of focusing of the objective lens 1. Further, when the tracking coils 6a, 6b, 6c and 6d are energized, the lens holder 2 rotates about the supporting shaft 11 by an electromagnetic action produced between the tracking coils 6a, 6b, 6c and 6d and permanent magnets 7a and 7b provided on the base 10, thereby enabling adjustment of tracking of the objective lens 1. Energization of the focusing coils 5a and 5b and the tracking coils 6a, 6b, 6c and 6d are performed by a servo system not shown. When the focusing coils 5a and 5b and the tracking coils 6a, 6b, 6c and 6d are de-energized, the lens holder 2 is restored to its original position.

However, in the prior-art objective lens driving apparatus as constructed above, since the lens holder 2 is supported by the supporting shaft 11 and four elastic members 4a, 4b, 4c and 4d only (i.e., since the objective lens driving apparatus isn't provided with any means for absorbing vibration of the lens holder 2 in the direction of the Z axis), when the system experiences any external impact or dynamic external force (especially, in the direction of the Z axis), it is possible for the lens holder 2 to sensitively respond to the impact or the force. As a result, continual reproducing of the recorded information cannot be assured. In addition, in the above-described prior-art objective lens driving apparatus, since the lens holder 2 is supported at its center of gravity onto the supporting shaft 11 with respect to the base 10, it is possible to suppress severe vibration in the direction of the X axis caused by any external impact or dynamic external force. However, in this case as well, there is a possibility for the lens holder 2 to start vibrating in the direction of the X axis caused by any known or unknown origin, since the objective lens driving apparatus isn't provided with any means for absorbing vibration of the lens holder 2 in the direction of the X axis, so the same result as above may occur.

Therefore, the above-described prior-art objective lens driving apparatus cannot be adapted to a system such as a portable CD player, a portable LD player, a portable CD-ROM driver or the like which is always under the dynamic external force, although it can be adapted to a system such as a CD player, an LD player, a CD-ROM driver or the like which is used in a stationary status.

SUMMARY OF THE INVENTION

The present invention is intended to overcome the above-mentioned and numerous other disadvantages and deficiencies of the prior art.

Therefore, it is an object of the present invention to provide an objective lens driving apparatus which is capable of efficiently absorbing vibration of a lens holder caused by any known or unknown origin, thereby continual reproducing of the recorded information can be assured.

To achieve the above-described object of the present invention, there is provided an objective lens driving apparatus which, in a preferred form, comprises: a base provided with a plurality of focusing and permanent magnets and a supporting post being mounted on an upper surface thereof; a supporting shaft mounted on the upper surface of the base; a lens holder for holding an objective lens at an extension thereof, the lens holder being rotatably and slidably fitted onto the supporting shaft at a position of the center of gravity of the lens holder and being provided with focusing coils and tracking coils, the lens holder being provided with one or more through holes being disposed at a side wall thereof; one or more elastic members stretched between the supporting post of the base and the lens holder in a plane including Y axis line joining the support shaft and the objective lens and Z axis line being axis line of the supporting shaft; and one or more damping members keeping vibration of the lens holder from being transmitted to the elastic members, the damping members being inserted between the through holes and the elastic members, respectively.

Preferably, each of the elastic members is an elastic wire made of phosphor bronze, and the elastic wire is projected into the lens holder through the side wall.

Preferably, each of the damping members is made of silicon gel or UV (ultraviolet) gel, and the central sectional area of each of the through holes is less than each of end sectional areas thereof.

According to the above-preferred form of the present invention, when the system experiences any external impact or dynamic external force, the lens holder responds to the impact or the force to vibrate relatively with respect to the base. However, the vibration is absorbed into the damping members being inserted between the through holes and the elastic members, respectively, to keep vibration of the lens holder from being transmitted to the elastic members.

Further, to achieve the above-described object of the present invention, there is provided an objective lens driving apparatus which, in another preferred form, comprises: a base provided with a plurality of focusing and permanent magnets and a supporting post having one or more through holes and being mounted on an upper surface thereof; a supporting shaft mounted on the upper surface of the base; a lens holder for holding an objective lens at an extension thereof, the lens holder being rotatably and slidably fitted onto the supporting shaft at a position of the center of gravity of the lens holder and being provided with focusing coils and tracking coils; one or more elastic members stretched between the supporting post of the base and the lens holder in a plane including Y axis line joining the supporting shaft and the objective lens and Z axis line being axis line of the supporting shaft; and one or more damping members keeping vibration of the lens holder from being transmitted through the elastic members to the supporting post of the base, the damping members being inserted between the through holes and the elastic members, respectively, wherein the lens holder being supported by the damping members through the elastic members.

Preferably, each of the elastic members is an elastic wire made of phosphor bronze, and the elastic wire is projected through and from the supporting shaft.

Preferably, each of the damping members is made of silicon gel or UV (ultraviolet) gel, the central sectional area of each of the through holes is less than each of end sectional areas thereof.

According to the above another preferred form of the present invention, when the system experiences any external impact or dynamic external force, the lens holder responds to the impact or force to vibrate relatively with respect to the base. However, the vibration is transmitted through the elastic members to the damping members, and the transmitted vibration is absorbed into the damping members being inserted between the through holes and the elastic members, respectively.

Therefore, according to the present invention as constructed above, since the lens holder is supported onto the supporting shaft by the elastic members and the damping members (i.e., since the objective lens driving apparatus is provided with the damping members for absorbing vibration of the lens holder), although the system experiences any external impact or dynamic external force, continual reproducing of the recorded information can be assured.

Further, according to the present invention as constructed above, since the damping members promptly absorb the vibration of the lens holder caused by any origin, prompt reproducing of the recorded information can be performed without needless overshooting in case of high speed moving of the optical pickup unit which requires great acceleration and deceleration of the optical pickup unit.

BRIEF DESCRIPTION OF THE DRAWINGS

The present invention may be better understood and its numerous object and advantages will be more apparent to those skilled in the art by reference to the accompanying drawings in which.

DESCRIPTION OF THE PREFERRED EMBODIMENTS

Figure 1:
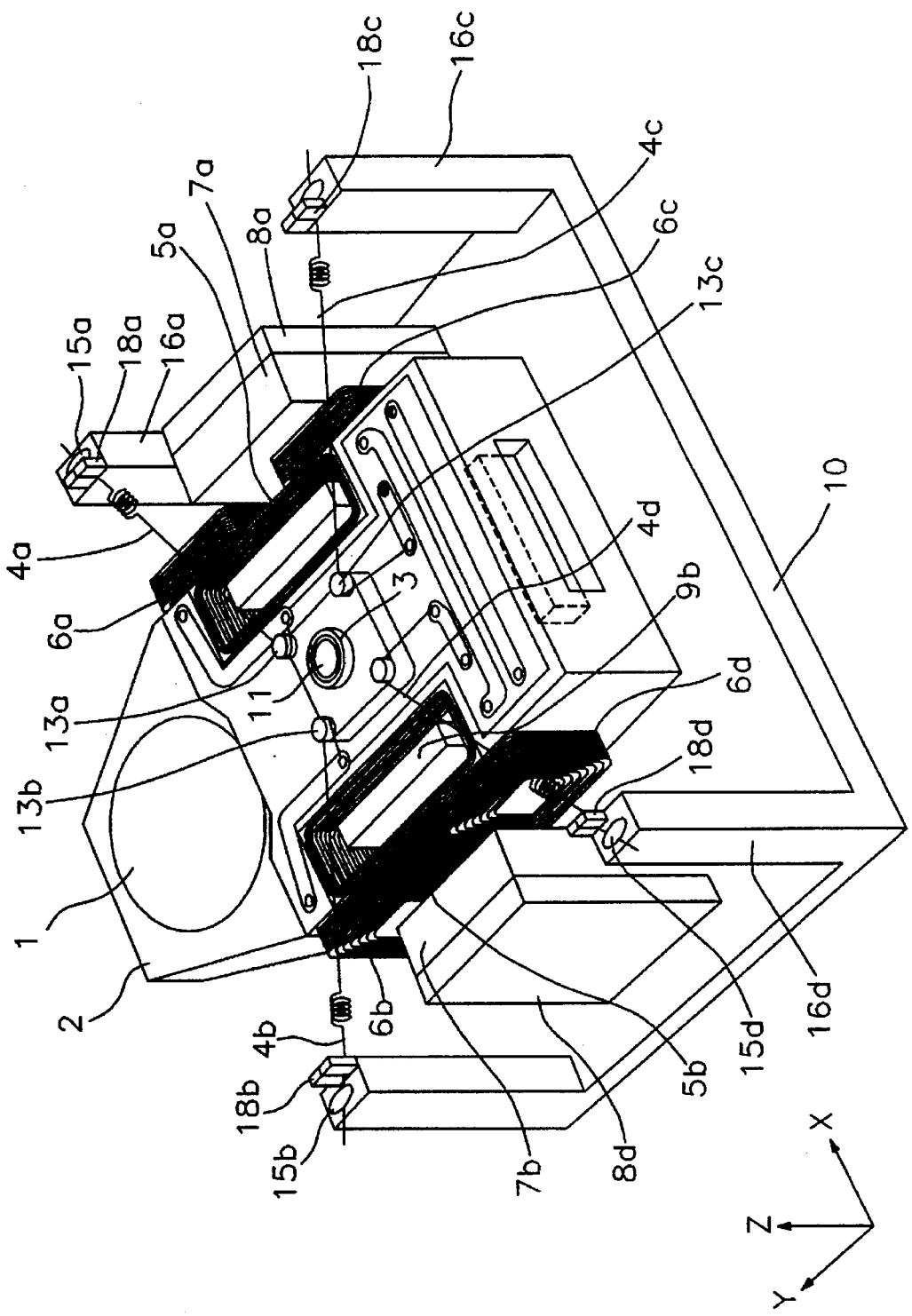
FIG. 1 is a perspective view showing prior-art objective lens driving apparatus for optical pickup unit.
Figure 2:
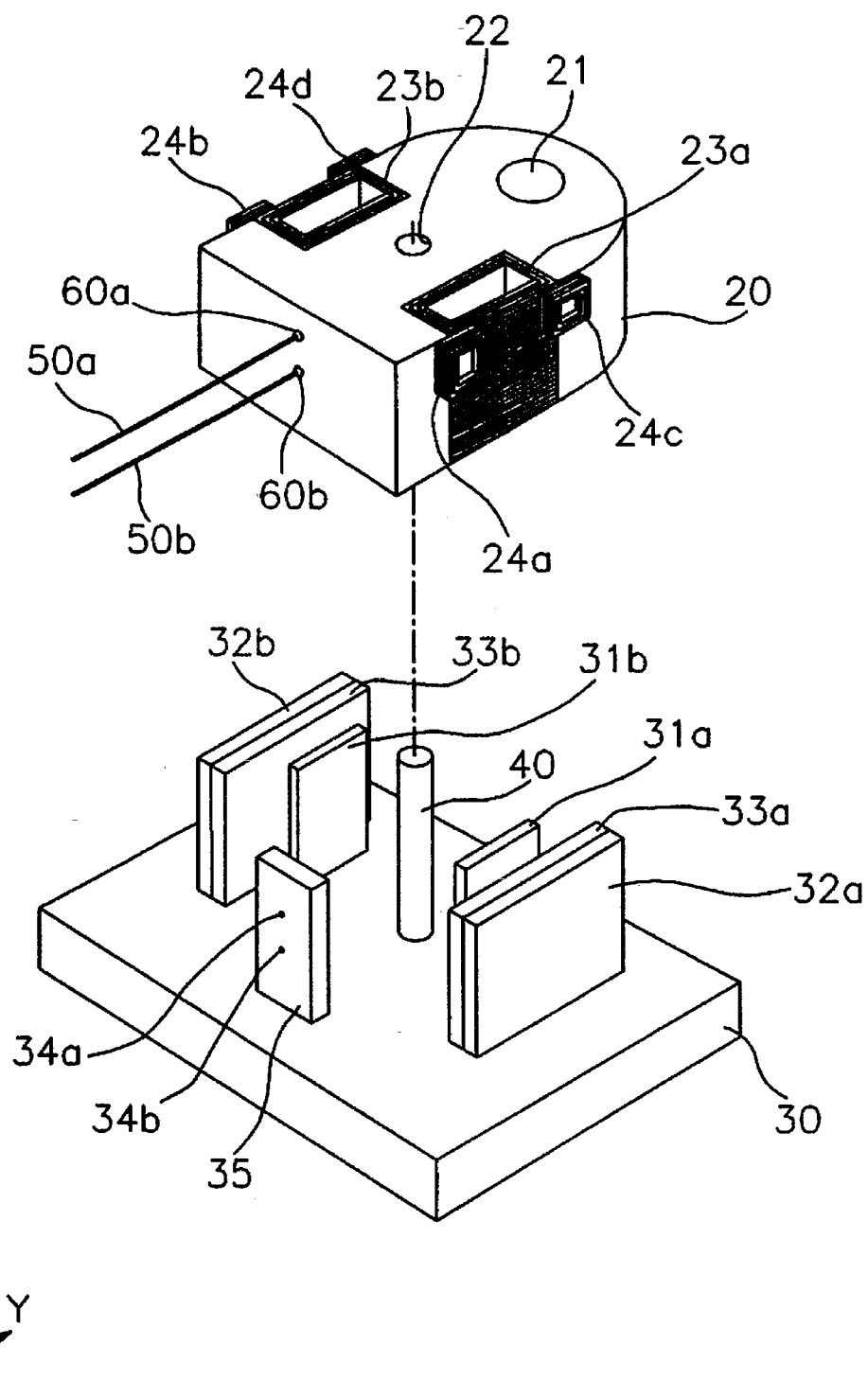
FIG. 2 is an exploded perspective view showing a preferred embodiment of an objective lens driving apparatus for optical pickup unit according to the present invention.
Figure 3:
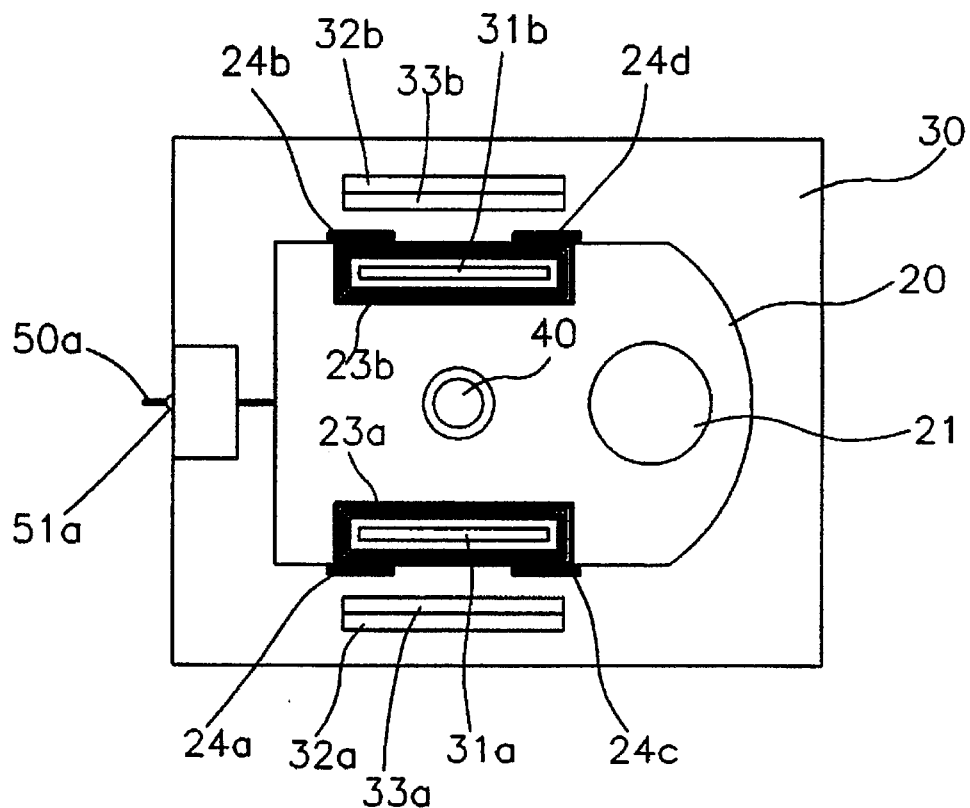
FIG. 3 is a top plan view of the objective lens driving apparatus for optical pickup unit shown in FIG. 2.
Figure 4:
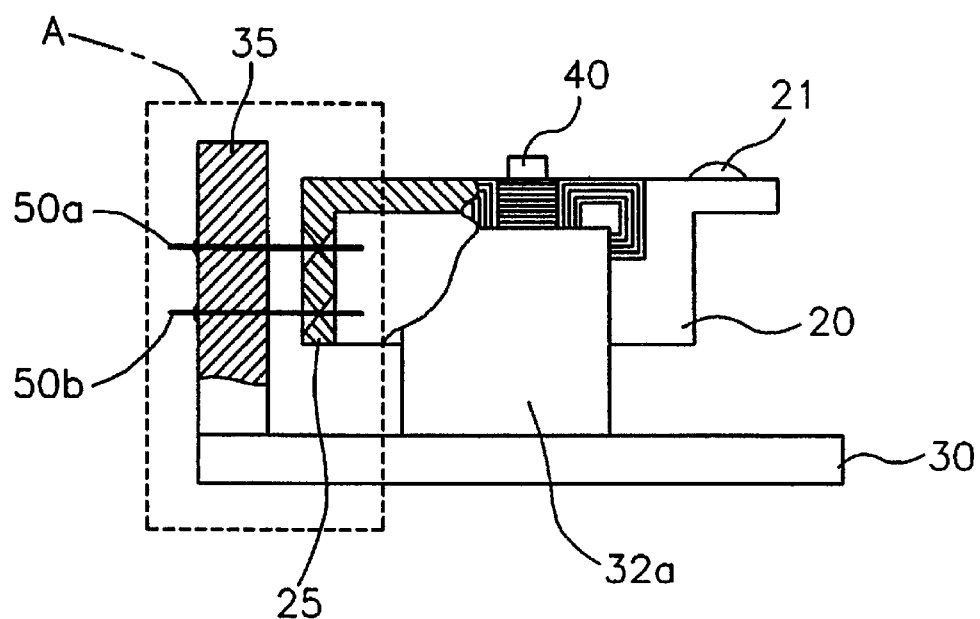
FIG. 4 is a front view, partly in section, of the objective lens driving apparatus for optical pickup unit shown in FIG. 2.

The preferred embodiments of this invention will be described in detail with reference to the accompanying drawings.

Hereinafter, the present invention will be described in detail with reference to the accompanying drawings.

FIGS. 2 to 5 show an exploded perspective view, a top plan view and a front view, respectively, of an objective lens driving apparatus according to the present invention.

A shown in FIGS. 2 through 5, the objective lens driving apparatus according to the present invention is provided with a lens holder 20, a base 30, a supporting shaft 40, elastic members 50a and 50b and damping members 60a and 60b.

Figure 5:
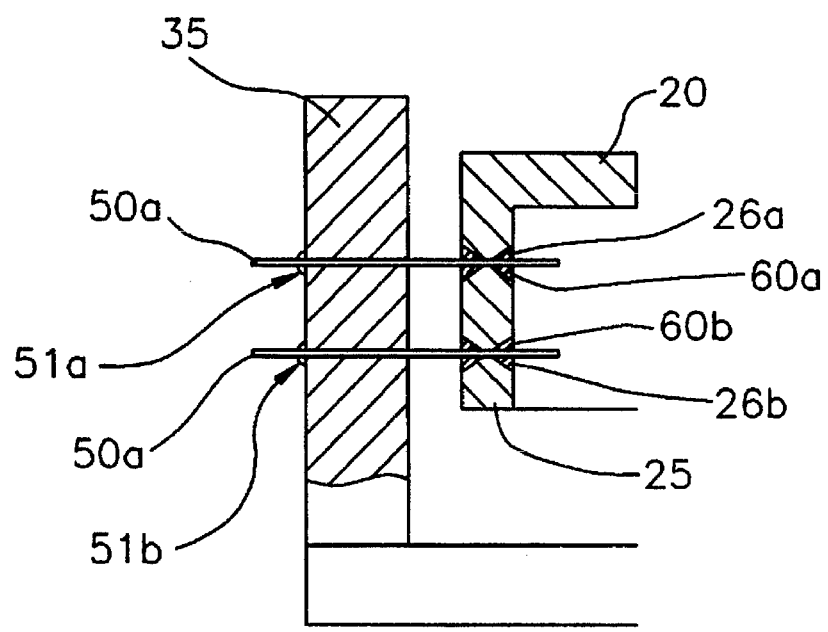
FIG. 5 is an enlarged view of a dotted block A shown in FIG. 4.

An objective lens 21 is fixedly inserted into an extension of the lens holder 20. A bearing bore 22 is formed at the center of gravity of the lens holder 20 including focusing coils 23a and 23b and tracking coils 24a, 24b, 24c and 24d. The lens holder 20 is rotatably and slidably fitted onto the supporting shaft 40. A line which joins the center of the objective lens 21 and the center of the bearing bore 22 is referred to as the "Y axis", the axis of the bearing bore 22 is referred to as the "Z axis", and a line intersecting the Y and Z axes is referred to as the "X axis". Focusing coils 23a and 23b are arranged symmetrically with respect to the X and Y axes in opposite recesses which are formed in the lens holder 20 along the Y axis. Four tracking coils 24a, 24b, 24c and 24d are arranged symmetrically with respect to the Y and X axes outwardly of the focusing coils 23a and 23b. Through holes 26a and 26b are formed at a side wall 25 of the lens holder 20. As shown in FIG. 5, the central sectional area of each of the through holes 26a and 26b is less than each of end sectional areas thereof.

The base 30 is provided with inner yokes 31a and 31b and outer yokes 32a and 32b, which are mounted symmetrically with respect to the Y axis. Permanent magnets 33a and 33b are fixed to the respective outer yokes 32a and 32b in such a manner that the polarity of each of the permanent magnets 33a and 33b is oriented in the same direction. The focusing coil 23a and the tracking coils 24a and 24c are inserted between the inner yoke 31a and the permanent magnet 33a, while the focusing coil 23b and the tracking coils 24b and 24d are inserted between the inner yoke 31b and the permanent magnet 33b. A supporting post 35 is mounted on an upper surface of the base 30, and engaging holes 34a and 34b are formed at the supporting post.

Elastic members 50a and 50b extend through engaging holes 34a and 34b formed at the supporting post 35, and are fixed to the supporting post 35 by solder joints 51a and 51b (See FIG. 5). The other ends of the elastic members 50a and 50b extend through the through holes 26a and 26d formed in the side wall 26 of the lens holder 20, and are engaged with the lens holder 20 by the damping members 60a and 60b. Preferably, each of the elastic members 50a and 50b is an elastic wire made of phosphor bronze, and each of the damping members 60a and 60b is made of silicon gel or UV (ultraviolet) gel. Each of the elastic members 50a and 50b is projected into the lens holder 20 through the side wall 26 to some extent. Therefore, although the system experiences severe external impact, the elastic members 50a and 50b do not easily deviate from the through holes 26a and 26b.

Hereinafter, the operation of the preferred embodiment of the objective lens driving apparatus according to the present invention having the above construction will be described.

When the focusing coils 23a and 23b are energized the lens holder 20 slides along the supporting shaft 40 by an electromagnetic action produced between the focusing coils 23a and 23b and permanent magnets 33a and 33b provided on the base 30, thereby enabling adjustment of focusing of the objective lens 21. Further, when the tracking coils 24a, 24b, 24c and 24d are energized, the lens holder 20 rotates about the supporting shaft 40 by an electromagnetic action produced between the tracking coils 24a, 24b, 24c and 24d and permanent magnets 33a and 33b provided on the base 30, thereby enabling adjustment of tracking of the objective lens 21. Energization of the focusing coils 23a and 23b and the tracking coils 24a, 24b, 24c and 24d are performed by a servo-system not shown. When the focusing coils 23a and 23b and the tracking coils 24a, 24b, 24c and 24d are de-energized, the lens holder 20 is restored to its original position.

At this moment, if the system experiences any external impact or dynamic external force, since the lens holder 20 is rotatably and slidably supported onto the supporting shaft 40 by the elastic members 50a and 50b with respect to the base 30, the lens holder 20 responds to the impact or force to vibrate relatively with respect to the base 30. However, the vibration is promptly absorbed into the damping members 60a and 60b being inserted between the through holes 26a and 26b and the elastic members 50a and 50b, respectively, thus, the vibration of the lens holder 20 is not transmitted to the elastic members 50a and 50b.

Figure 6:
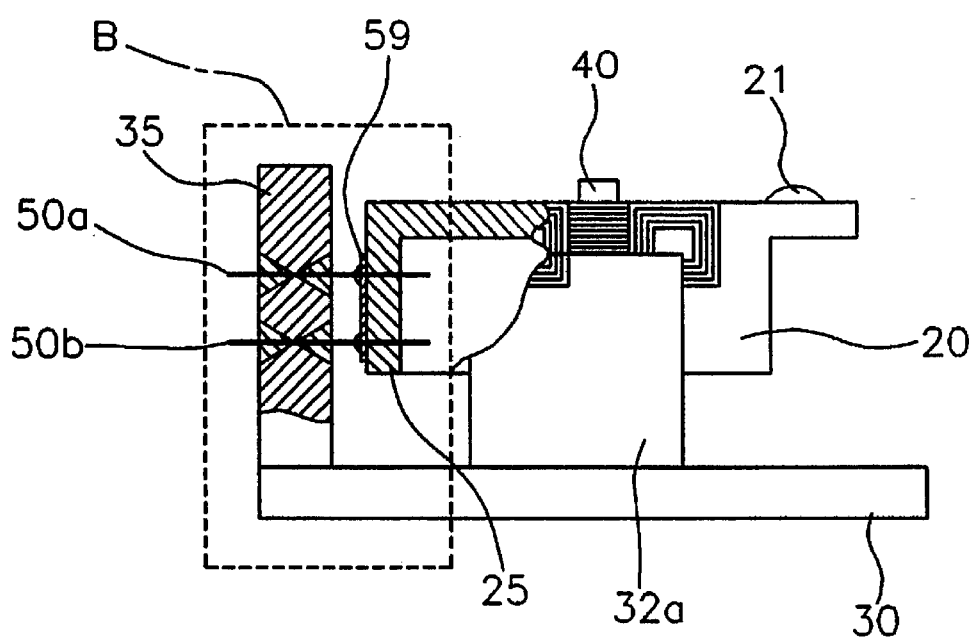
FIG. 6 is a front view, partly in section, of another preferred embodiment of the objective lens driving apparatus for optical pickup unit according to the present invention.
Figure 7:
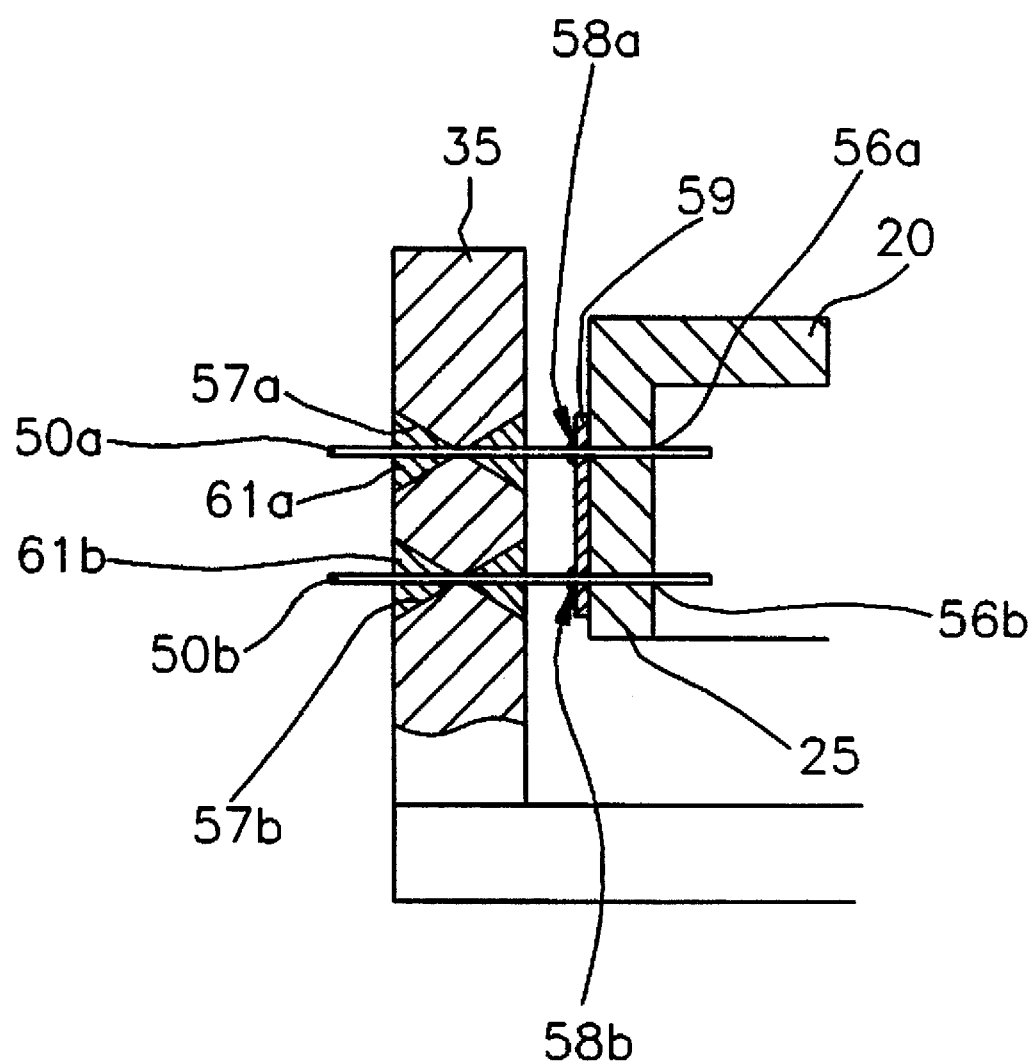
FIG. 7 is an enlarged view of a dotted block B shown in FIG. 6.

In FIGS. 6 and 7, there is illustrated another preferred embodiment of the objective lens driving apparatus according to the present invention.

Referring now to FIGS. 6 and 7, the objective lens driving apparatus according to the present invention is provided with a lens holder 20, a base 30, a supporting shaft 40, elastic members 50a and 50b and damping members 61a and 61b, similarly to the above preferred embodiment.

As is apparent in FIGS. 6 and 7, in this another preferred embodiment, differently from the above first preferred embodiment, engaging holes 56a and 56b are formed at the side wall 25 of the lens holder 20 not in the supporting post 35 of the base 30, and through holes 57a and 57b are formed in the supporting post 35 of the base 30 not in the side wall 25 of the lens holder 20. The elastic members 50a and 50b extend through engaging holes 56a and 56b formed in the side wall 25 of the lens holder 20, and are fixed at the side wall 35 by solder joints 58a and 58b (See FIG. 7). The other ends of the elastic members 50a and 50b extend through the through holes 57a and 57b formed in the supporting shaft 35, and are engaged with the lens holder 20 by the damping members 61a and 61b.

In this case, since the lens holder 20 is usually made of engineering plastics, it is difficult to solder the elastic members directly to the lens holder 20. Therefore, in this embodiment, an incombustible plate (e.g., bakelite plate coated with copper) 59 is first attached to the side wall 25 of the lens holder 20 by adhesive (not shown) such as UV (ultraviolet) bond, and thereafter, the elastic members 50a and 50b are fixed to the incombustible plate 59 by solder joints 58a and 58b. Thus, the elastic members 50a and 50b are fixed to the lens holder 20.

The other ends of the elastic members 50a and 50b are projected out of the supporting shaft 35 of the base 30 to some extent. Therefore, although the system experiences severe external impact, the elastic members 50a and 50b do not easily deviate from the through holes 57a and 57b.

In the above-described another preferred embodiment of the objective lens driving apparatus according to the present invention, although the system experiences any external impact or dynamic external force, since the lens holder 20 is rotatably and slidably supported onto the supporting shaft 40 by the elastic members 50a and 50b with respect to the base 30, the lens holder 20 responds to the impact or force to vibrate relatively with respect to the base 30. Then, the vibration is transmitted through the elastic members 50a and 50b to the damping members 61a and 61b, and the transmitted vibration is promptly absorbed into the damping members 60a and 60b being inserted between the through holes 57a and 57b and the elastic members 50a and 50b, respectively.

Therefore, according to the present invention as described above, since the lens holder 20 is supported onto the supporting shaft 40 by the elastic members 50a and 50b and the damping members 60a and 60b (or 61a and 61b) (i.e., since the objective lens driving apparatus is provided with the damping members 60a and 60b (or 61a and 61b) for absorbing vibration of the lens holder 20), although the system experiences any external impact or dynamic external forces, continual reproducing of the recorded information can be assured.

Further, according to the present invention as described above, since the damping members 60a and 60b (or 61a and 61b) promptly absorb the vibration of the lens holder 20 caused by any origin, prompt reproducing of the recorded information can be performed without needless overshooting in case of high speed moving of the optical pickup unit which requires great acceleration and deceleration of the optical pickup unit.

Accordingly, the above-described objective lens driving apparatus according to the present invention can be adapted to a system such as a portable CD player, a portable LD player, a portable CD-ROM driver or the like which is always under the dynamic external force as well as a system which is used in a stationary status.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. An objective lens driving apparatus comprising:

a base provided with a plurality of permanent magnets and a supporting post mounted on an upper surface thereof;

a supporting shaft mounted on the upper surface of the base;

a lens holder for holding an objective lens at an extension thereof, the lens holder being rotatably and slidably fitted onto the supporting shaft at a position of the center of gravity of the lens holder and being provided with focusing coils and tracking coils, the lens holder being provided with at least one through hole being disposed at a side wall thereof;

at least one elastic member for elastically supporting the lens holder, the elastic member being positioned in a plane formed with a line connecting the supporting shaft and the objective lens and an axial line of the supporting shaft; and at last one damping member for keeping a vibration of the lens holder from being transmitted to the at least one elastic member, the at least one damping member being inserted between the at least one through hole and the elastic member, respectively.

2. An objective lens driving apparatus according to claim 1, wherein the at least one elastic member is an elastic wire made of phosphor bronze.

3. An objective lens driving apparatus according to claim 2, wherein the elastic wire is projected into the lens holder through the side wall.

4. An objective lens driving apparatus according to claim 1, wherein the at least one damping member is made of silicon gel.

5. An object lens driving apparatus according to claim 1, wherein the at least one damping member is made of UV (ultraviolet) gel.

6. An objective lens driving apparatus according to claim 1, wherein central sectional are of the at least one through hole is less than an end sectional area thereof.

7. An objective lens driving apparatus comprising:

a base provided with a plurality of permanent magnets and a supporting post have at least one through hole and being mounted on an upper surface thereof;

a supporting shaft mounted on the upper surface of the base;

a lens holder for holding an objective lens at an extension thereof, the lens holder being rotatably and slidably fitted onto the supporting shaft at a position of the center of gravity of the lens holder and being provided with focusing coils and tracking coils;

at least one elastic member for elastically supporting the lens holder, the elastic member being positioned in a plane formed with a line connecting the supporting shaft and the objective lens and an axial line of the supporting shaft; and at least one damping member for keeping vibration of the lens holder from being transmitted through the at least one elastic member to the supporting post of the base, the at least one damping member being inserted between the at least one through hole and the elastic member, respectively, wherein the lens holder is supported by the at least one damping member through the at least one elastic member.

8. An objective lens driving apparatus according to claim 7, wherein the at least one elastic member is an elastic wire made of phosphor bronze.

9. An objective lens driving apparatus according to claim 8, wherein the elastic wire is projected through and from the supporting shaft.

10. An objective lens driving apparatus according to claim 7, wherein the at least one damping member is made of silicon gel.

11. An objective lens driving apparatus according to claim 7, wherein the at least one damping member is made of UV (ultraviolet) gel.

12. An objective lens driving apparatus according to claim 7, wherein central sectional area of the at least one through hole is less than an end sectional area thereof.

* * * * *